United States Patent [19]
Schmitt

[11] Patent Number: 5,477,899
[45] Date of Patent: Dec. 26, 1995

[54] MACHINE TOOL FOR MACHINING WORKPIECES MAD OF WOOD, PLASTIC, ETC.

[75] Inventor: Gerhard Schmitt, Grossrinderfeld, Germany

[73] Assignee: Michael Weinig Aktiengesellschaft, Tauberbischofsheim, Germany

[21] Appl. No.: 344,933

[22] Filed: Nov. 23, 1994

[30] Foreign Application Priority Data

Nov. 24, 1993 [DE] Germany .................... 43 39 953.3

[51] Int. Cl.$^6$ ................... B27C 1/00; B27C 1/14
[52] U.S. Cl. ............ 144/116; 144/114 R; 144/129; 144/242 A; 144/242 B; 144/243; 144/252 R; 144/373
[58] Field of Search ................ 144/2 R, 3 R, 144/3 P, 114 R, 116, 117 R, 129, 242 R, 242 A, 242 B, 243, 244, 249 R, 249 A, 250 R, 250 A, 252 R, 373

[56] References Cited

U.S. PATENT DOCUMENTS

| | | | |
|---|---|---|---|
| 985,366 | 2/1911 | Orton | 144/250 R |
| 2,312,439 | 3/1943 | Peterson | 144/116 |
| 2,432,190 | 12/1947 | Dick | 144/117 |
| 2,642,902 | 6/1953 | Carey | 144/129 |
| 2,859,780 | 11/1958 | Carlson | 144/116 |
| 3,038,508 | 6/1962 | Wilson | 144/242 B |
| 4,067,370 | 1/1978 | Chang | 144/117 R |
| 4,457,350 | 7/1984 | Finnila | 144/249 A |
| 4,476,906 | 10/1984 | Crawford et al. | 144/116 |
| 5,368,077 | 11/1994 | Croghan et al. | 144/116 |
| 5,415,212 | 5/1995 | Lenton | 144/243 |

*Primary Examiner*—W. Donald Bray
*Attorney, Agent, or Firm*—Robert W. Becker & Associates

[57] ABSTRACT

A machine tool for machining a workpiece fed in a transporting direction through the machine tool has a support surface for the workpiece and at least one upper rotary tool positioned above the support surface. At least one lower rotary tool is positioned below the support surface. A supporting device for supporting the workpiece during machining with the at least one lower rotary tool has a pressing device with at least one first pressing member upstream of the lower rotary tool and at least one second pressing member downstream of the lower rotary tool. The supporting device further includes at least one abutment member positioned above the pressing device. The workpiece is pressed upwardly by the at least one first and second pressing members against the at least one abutment member during machining.

8 Claims, 1 Drawing Sheet

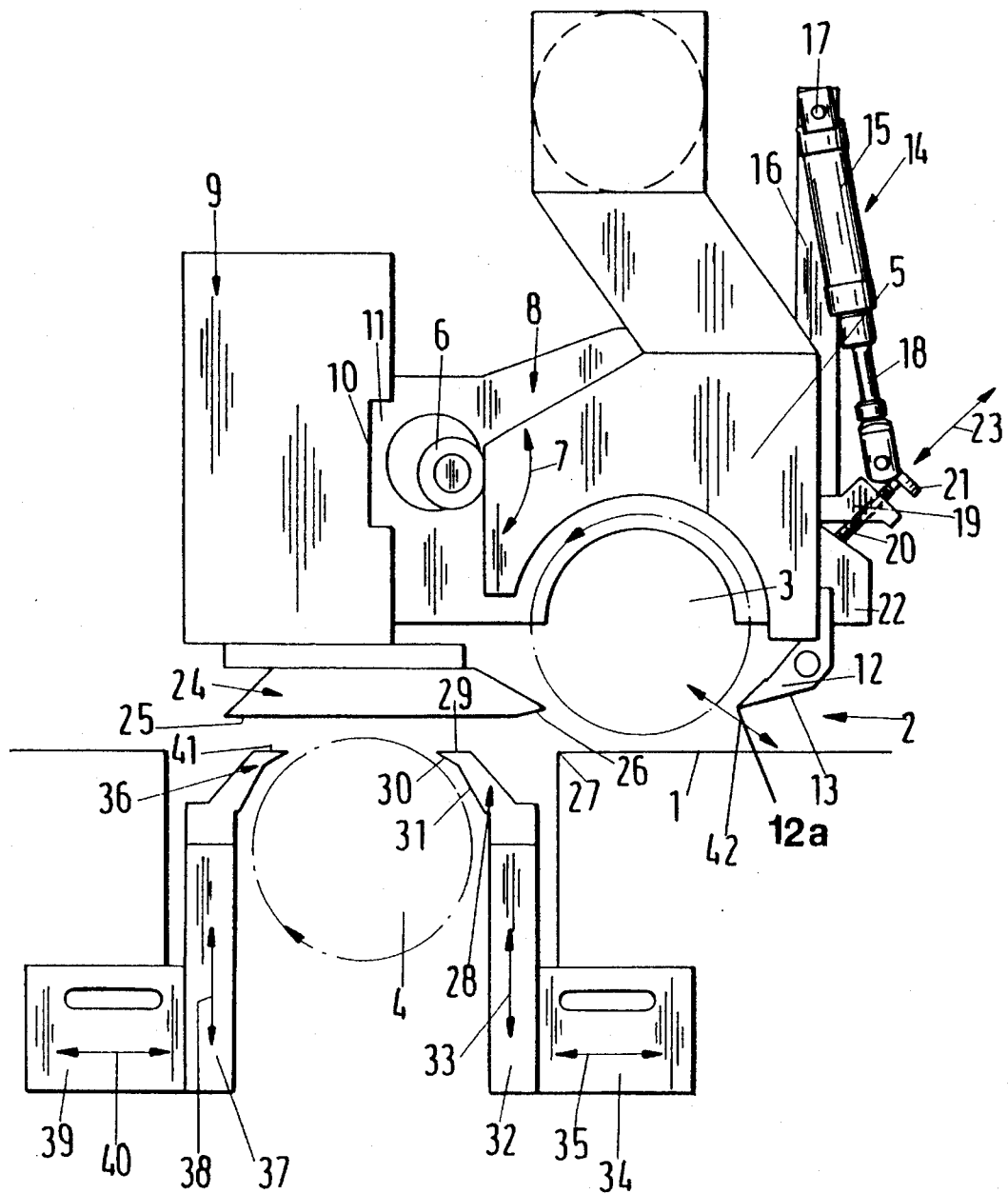

MACHINE TOOL FOR MACHINING WORKPIECES MAD OF WOOD, PLASTIC, ETC.

BACKGROUND OF THE INVENTION

The present invention relates to a machine tool for machining workpieces made of wood, plastic, etc., having at least one upper rotary tool above a support surface for the workpiece and at least one further lower rotary tool below the support surface for machining the underside of the workpiece and further having a supporting device that has at least one pressing device acting on the workpiece upstream and downstream of the lower rotary working tool.

Machine tools are known with which rods of a round or square cross-section can be manufactured from a workpiece by milling. The two rotary tools arranged one after another in the transporting direction of the workpiece machine the workpiece first at the upper side and subsequently at the underside. The pressing device coordinated with the lower rotary tool is positioned within the area above the lower rotary tool and loads the workpiece in a downward direction toward the tool. However, this arrangement does not allow for a precise guiding of the workpiece during the machining process so that the rods to be manufactured will not have a sufficient manufacturing precision.

It is therefore an object of the present invention to provide a machine of the aforementioned kind with which a workpiece can be machined with high precision.

SUMMARY OF THE INVENTION

The machine tool for machining a workpiece fed in a transporting direction through the machine tool according to the present invention is primarily characterized by:

A support surface for the workpiece;

At least one upper rotary tool positioned above the support surface;

At least one lower rotary tool positioned below the support surface;

A supporting device for supporting the workpiece during machining with the at least one lower rotary tool, the supporting device comprising:

a) a pressing device with at least one first pressing member upstream of the at least one lower rotary tool and at least one second pressing member downstream of the lower rotary tools; and b) at least one abutment member positioned above the pressing device, wherein the workpiece is pressed upwardly by the at least one first and second pressing members against the at least one abutment member during machining.

Preferably, at least one of the first and second pressing members is vertically displacable.

Advantageously, the pressing device comprises a first positioning member and a first carrier for the at least one first pressing member, the first carrier connected to the first positioning member so as to be vertically displacable, and further comprises a second positioning member and a second carrier for the at least one second pressing member, the second carrier connected to the second positioning member so as to be vertically displacable.

Expediently, the first and the second positioning members are displaceable perpendicularly relative to the first and second carriers, respectively. Advantageously, the first and second positioning members are displacable vertically relative to the first and second carriers.

In a preferred embodiment of the present invention, the at least one abutment member is positioned above the at least one lower rotary tool.

In another embodiment of the present invention, the at least one abutment member is positioned above at least one of the first and second pressing members.

Advantageously, at least one of the first and second pressing members is displacable in the transporting direction of the workpiece.

In the inventive machine tool the pressing members are arranged such in the area upstream and downstream of the lower rotary tool that the workpiece to be machined is upwardly pressed against the abutment member. Since the pressing members are positioned under the workpiece, they can at the same time serve as a means for supporting the workpiece during machining. The workpiece is precisely guided during machining so that rods can be produced at a high manufacturing speed from the workpiece.

BRIEF DESCRIPTION OF THE DRAWING

The object and advantages of the present invention will appear more clearly from the following specification in conjunction with the accompanying drawing in which one embodiment of the present invention is represented schematically.

DESCRIPTION OF PREFERRED EMBODIMENTS

The present invention will now be described in detail with the aid of several specific embodiments utilizing the only figure.

The machine tool for machining a workpiece of wood, plastic, etc. is provided with a support surface 1 that may be in the form of a machine table etc. Workpieces (not shown) are transported on the support surface 1 in the direction of arrow 2 through the machine tool. The transporting device can be in the form of rotatably driven rollers resting on the workpiece. Such rollers or similar devices are known in the art and need not be described in detail.

The workpiece is first machined by an upper rotary tool 3 positioned on a horizontal spindle which upper rotary tool 3 is driven in rotation in a direction indicated by the arrow. In the transporting direction 2 a further lower rotary tool 4 is provided spaced at a distance downstream of the upper rotary tool 3. The rotary tool 4 is positioned on a horizontal lower spindle and machines the underside of the workpiece. With the two rotary tools 3, 4 round rods or strips are manufactured from the workpiece. Accordingly, the two rotary tools 3, 4 are profiled in the axial direction such that, for example, from a rectangular elongate workpiece a plurality of adjacently positioned round rods are produced.

The rotary tool 3 is positioned under a suction hood 5 with which during machining of the workpiece the resulting cuttings etc. are removed. The suction hood 5 can be adjusted in the direction of arrow 7 with an eccentric drive 6. Such an adjustment is, for example, necessary when on the upper horizontal spindle a rotary tool 3 is to be mounted that has a different diameter resulting in a different operating circle, described by the rotary tool 3.

The eccentric drive 6 is provided on a carrier 8 forming a spindle slide which, in a manner known per se, is adjustable in the vertical direction in order to accommodate workpieces of different heights.

In the direction of transportation 2 a pressing element 12 is provided upstream of the rotary tool 3 and connected to the suction hood 5. The pressing element 12 is provided with a pressing surface 13 that in the direction of transportation 2 is positioned at a forward and downward slant relative to the advancing direction (see Figure). Due to this pressing element 12 the workpiece to be machined is securely forced against the support surface 1. The pressing element 12 is loaded by a piston-cylinder-unit 14. The upper end of the cylinder 15 is connected to the upper end of the arm 16. The arm 16 is a component of the spindle slide (carrier 8). The pivot axis 17 of the cylinder 15 lies parallel to the axis of rotation of the rotary tool 3. The piston rod 18 is connected to a holder 19 connected to the suction hood 5. An adjusting screw 20 is positioned in the holder 19 so as to be rotatably supported therein. The adjusting screw 20 is equipped with a grip 21 with which the adjusting screw 20 can be easily turned. The free end of the adjusting screw 20 rests at an abutment 22 which is part of the spindle slide (carrier 8). When turning it, the adjusting screw 20 is displaced in the direction of double arrow 23. By doing so, the holder 19 pivots the suction hood 5 about the axis of the eccentric drive 6 (arrow 7). Since the pressing element 12 is connected to the suction hood 5, this movement also allows for changing the distance between the tip 12a of the pressing element 12 that is facing the rotary tool 3 and the support surface 1. Thus, the pressing element 12 can be finely and precisely adjusted to the thickness (height) of the workpiece to be machined. With the eccentric drive 6 the distance of the tip 12a of the pressing element 12 to the circle described by the working tool 3 can be adjusted (arrow 42).

The preferably pneumatic piston cylinder-unit 14 is constantly pressurized and thus exerts a force via the suction hood 5 onto the pressing element 12 so that the workpiece moving below the pressing element 12 in the direction of transportation 2 is tightly pressed against the support surface 1.

Downstream of the workpiece 3 (in the direction of transportation 2) an abutment member 24 that is connected to the underside of a support 9 is provided. The support 9 is height-adjustable for adaptation to various operating circles described by the rotary tool 4 in a manner known per se. However, it is also possible that only the abutment member 24 is height-adjustable. The support 9 is provided at the spindle slide (carrier 8). Preferably, the abutment member 24 is adjustable alone or together with the support 9 in and counter to the direction of transportation 2 as well as in the horizontal plane perpendicular to the transporting direction 2, i.e., parallel to the axis of rotation of the rotary tools 3, 4. The abutment member 24 extends into the proximity of the rotary tool 3 and is positioned at a distance above the rotary tool 4. The abutment member 24 in a side view is shaped as a trapezoid whereby the longer side 25 is the abutment surface for the workpiece during machining by the rotary tool 4. At the end facing the rotary tool 3 the abutment surface 25 has a slight upward slant. Thus, it is ensured that the workpiece to be machined, when it passes in the direction of transportation 2 under the tool 3, cannot be caught on the edge of the abutment member 24. The edge 26 of the abutment surface 25 facing the tool 3 is substantially positioned at the level of the forward end 27 of the portion of the support surface 1 positioned under the rotary tool 3. The support surface 1 is discontinued in the area of the rotary tool 4. Between the rotary tool 4 and the part of the support surface 1 below the rotary tool 3 a pressing member 28 is provided that has a planar pressing surface 29 on which the workpiece rests after passing below the upper rotary tool 3.

The pressing surface 29 is positioned slightly above the level of the support surface 1. The pressing surface 29 extends into the proximity of the working diameter of the lower rotary tool 4 so that the workpiece is safely supported shortly before being machined by the rotary tool 4. The end face of the pressing member 28 facing the tool rotary 4 is formed by two forward sides 30 and 31 positioned at an obtuse angle relative to one another. With this embodiment, pressing member 28 can be positioned very closely to the operating circle described by the rotary tool 4. The pressing member 28 is positioned on a carrier 32 which is adjustable in the vertical direction 33. The carrier 32 is connected to a positioning member 34 which is adjustable perpendicular to the adjusting direction 33 in the horizontal direction 35. Accordingly, the pressing member 28 can be adjusted in two directions that are perpendicular to one another and can thus be optimally adjusted relative to the rotary tool 4. The carrier 32 is supported in a slidable manner within suitable guides on the positioning member 34. The positioning Member 34 itself is adjustably supported with corresponding guides on the machine tool.

While the pressing member 28 in the direction of transportation is positioned directly upstream of the rotary tool 4, the further pressing member 36 is provided in the direction of transportation directly downstream of the rotary tool 4. The further pressing member 36 is embodied identical to the pressing member 28, the only difference being the mirror-symmetrical arrangement relative to the pressing element 28. The pressing member 36 is also positioned on a carrier 37 which is height adjustable in the direction 38. The carrier 37 is connected to a positioning member 39 which is adjustable perpendicular relative to the adjusting direction 38 in the direction of arrow 40. In the shown embodiment, the positioning member 39 is adjustable in the horizontal direction. Accordingly, the pressing member 36 can also be adjusted in two directions that are perpendicular to one another. The pressing member 36 has a planar pressing surface 41 for the workpiece. The pressing members 28, 36 with the corresponding positioning members 34, 39 are, as shown in the drawing, arranged mirror-symmetrical to one another. The abutment member 24 is arranged in the area above the lower rotary tool 4 such that the abutment surface 25 overlaps the two pressing surfaces 29 and 41 of the lower pressing members 28 and 36. Furthermore, the abutment surface 25 of the upper abutment member 24 extends into the proximity of the portion of the support surface 1 that is positioned in the direction of transportation 2 downstream of the rotary tool 4.

On the support surface 1 a workpiece is advanced in the direction of transportation 2 to the machine tool and is tightly pressed onto the support surface 1 with the pressing element 12. The workpiece is then machined with the rotary tool 3. When it is desired to produce round rods from the workpiece, the rotary tool 3 first mills the upper side of the workpiece with adjacent profilings having in cross-section a semi-circular shape. Directly downstream of the rotary tool 3 the workpiece, with its upper side machined, is engaged by the abutment member 24 and subsequently by the pressing member 28. With this arrangement the workpiece is optimally supported directly upstream of the lower rotary tool 4. The workpiece is machined on its underside by the tool 4 since the circle described by the tool 4 extends past the plane that is defined by the pressing surfaces 29, 41, and the other half of the workpiece is milled so that now individual separate round rods are formed. During machining by the tool 4 the workpiece is optimally supported in the manner of a three-point or triangular supporting action by the abutment and pressing members 24, 28, 36 and is guided such that the round rods can be precisely manufactured. Instead of the round rods it is also possible to mill square or rectangular rods from the workpiece. In this case respective working tools 3 and 4 are being used. Due to the triangular support 5 it is also possible to machine short workpieces in a flawless manner.

If desired, the pressing members 28, 36, for example, when a workpiece jam in the area of the tool 4 occurs, can be downwardly moved so that jammed workpieces can be removed easily. For the same purpose it may also be expedient to provide the piston-cylinder unit 14 so as to be double-acting: for example, when a jam of workpieces occurs within the area of the tool 3, the suction hood 5 can be lifted off the workpiece.

The present invention is, of course, in no way restricted to the specific disclosure of the specification and drawings, but also encompasses any modifications within the scope of the appended claims.

What I claim is:

1. A machine tool for machining a workpiece fed in a transporting direction through said machine tool, said machine tool comprising:

a support surface for the workpiece;

at least one upper rotary tool positioned above said support surface;

at least one lower rotary tool positioned below said support surface;

a supporting device for supporting the workpiece while being machined by said at least one lower rotary tool, said supporting device comprising:

a) a pressing device with at least one first pressing member upstream of said lower rotary tool and at least one second pressing member downstream of said lower rotary tool; and b) at least one abutment member positioned above said pressing device, wherein the workpiece is pressed upwardly by said at least one first and second pressing members against said at least one abutment member during machining.

2. A machine tool according to claim 1, wherein at least one of said first and second pressing members is vertically displaceable.

3. A machine tool according to claim 2, wherein said pressing device comprises a first positioning member and a first carrier for said at least one first pressing member, said first carrier connected to said first positioning member so as to be vertically displaceable, and further comprises a second positioning member and a second carrier for said at least one second pressing member, said second carrier connected to said second positioning member so as to be vertically displaceable.

4. A machine tool according to claim 3, wherein said first and said second positioning members are displaceable perpendicularly relative to said first and said second carriers.

5. A machine tool according to claim 4, wherein said first and said second positioning members are displaceable vertically relative to said first and said second carriers.

6. A machine tool according to claim 1, wherein said at least one abutment member is positioned above said at least one lower rotary tool.

7. A machine tool according to claim 1, wherein said at least one abutment member is positioned above at least one of said first and second pressing members.

8. A machine tool according to claim 1, wherein at least one of said first and second pressing members is displaceable in the transporting direction of the workpiece.

* * * * *

UNITED STATES PATENT AND TRADEMARK OFFICE
CERTIFICATE OF CORRECTION

PATENT NO. : 5,477,899
DATED      : December 26, 1995
INVENTOR(S) : Schmitt

It is certified that error appears in the above-indentified patent and that said Letters Patent is hereby corrected as shown below:

On title page, item [54], and col. 1, lines 2-3, should read as follows:

-- MACHINE TOOL FOR MACHINING WORKPIECES MADE
OF WOOD, PLASTIC, ETC.--

Signed and Sealed this

Twenty-eighth Day of May, 1996

Attest:

BRUCE LEHMAN

*Attesting Officer*              *Commissioner of Patents and Trademarks*